(12) United States Patent
Gammie

(10) Patent No.: US 7,208,617 B2
(45) Date of Patent: Apr. 24, 2007

(54) HYDROLYSIS OF CHLOROSILANES

(75) Inventor: Andrew Bruce Gammie, Florence, KY (US)

(73) Assignee: Dow Corning Corporation, Midland, MI (US)

( * ) Notice: Subject to any disclaimer, the term of this patent is extended or adjusted under 35 U.S.C. 154(b) by 302 days.

(21) Appl. No.: 10/958,768

(22) Filed: Oct. 5, 2004

(65) Prior Publication Data

US 2006/0074189 A1    Apr. 6, 2006

(51) Int. Cl.
C07F 4/04     (2006.01)
C07F 7/12     (2006.01)
C07F 7/07     (2006.01)

(52) U.S. Cl. .................. 556/450; 556/452; 556/460

(58) Field of Classification Search .......... 556/460, 556/452, 461
See application file for complete search history.

(56) References Cited

U.S. PATENT DOCUMENTS 4,382,145 A * 5/1983 Yeboah .............. 556/460

* cited by examiner

Primary Examiner—Karl Puttlitz
(74) Attorney, Agent, or Firm—Jim L. DeCesare; Roger E. Gobrogge

(57) ABSTRACT

Chlorosilanes are hydrolyzed to a hydrolysate in a looped system containing a hydrolysis reactor, an HCl purifier, a wash means, and a separator. The steps of the method comprise:
(i) feeding chlorosilanes from an external source to the hydrolysis reactor,
(ii) feeding water from an external source to the wash means,
(iii) feeding a high concentration aqueous HCl of at least 10 percent by weight HCl from an external source to the hydrolysis reactor between the wash means and the hydrolysis reactor,
(iv) removing anhydrous hydrogen chloride from the HCl purifier,
(v) removing hydrolysate from the wash means, and
(vi) removing a low concentration aqueous hydrogen chloride of 0.1 to less than 10 percent by weight HCl from the looped system.

6 Claims, 1 Drawing Sheet

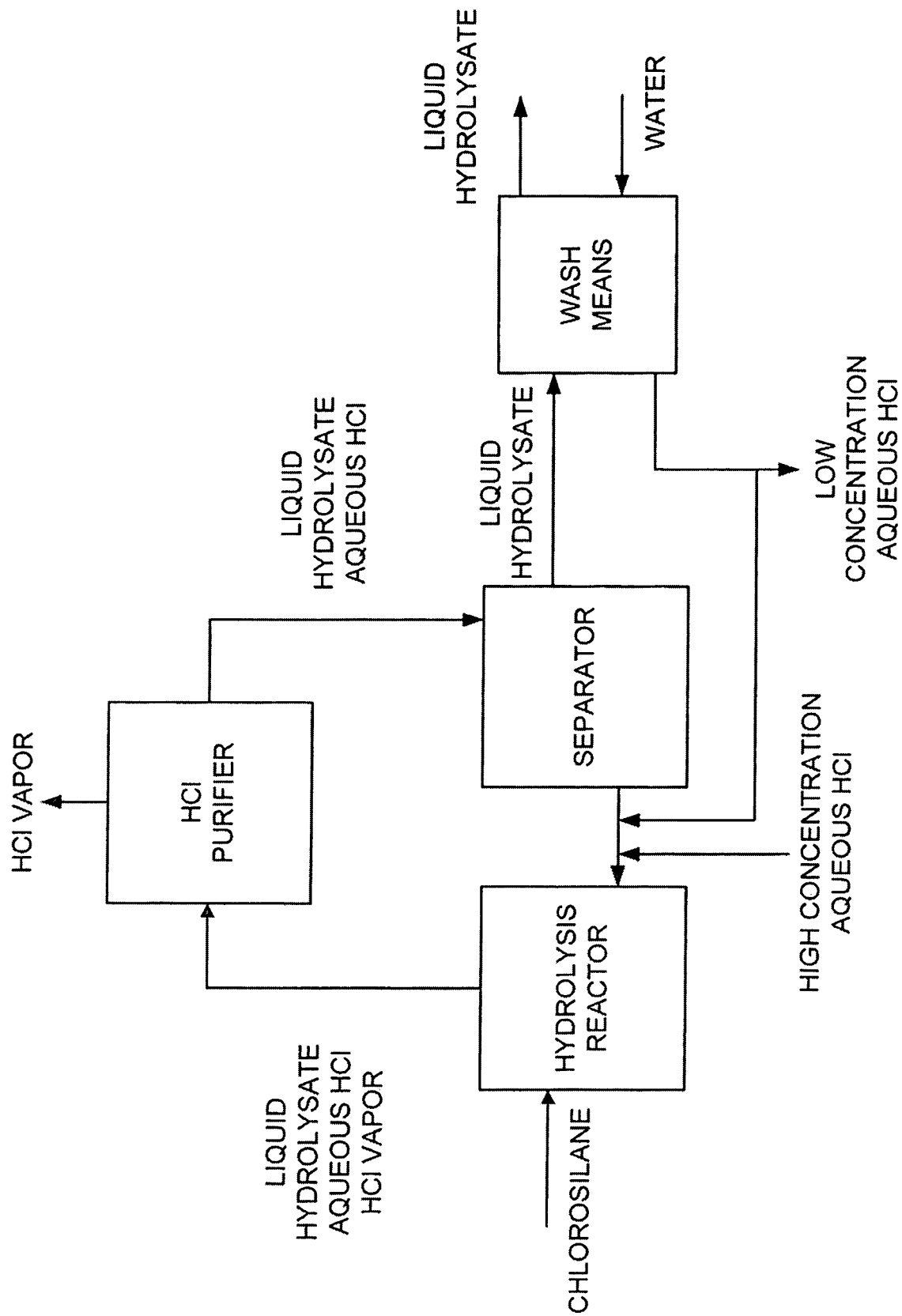

HYDROLYSIS OF CHLOROSILANES

This invention relates to a method of maximizing the recovery of hydrogen chloride in a process of hydrolyzing chlorosilanes to produce a hydrolysate containing polysiloxanes.

The manufacture of polydimethylsiloxane polymers is a multistep process. The hydrolysis of chlorosilanes obtained from the direct process is well known in the art and yields a mixture cyclic and linear silanol-stopped oligomers called hydrolysate. In some instances, chloro-stopped polymers are also obtained.

The ratio of cyclic to linear oligomers, as well as the chain length of the linear siloxanes, is controlled by the conditions of the hydrolysis, such as the ratio of chlorosilane to water, temperature, contact time, and solvents. Commercially, the hydrolysis of dimethyldichlorosilane is performed by either a batch or a continuous process. In the typical industrial operation, dimethyldichlorosilane is mixed with water in a continuous reactor. The mixture of hydrolysate and aqueous HCl is separated in a decanter. Anhydrous HCl is removed and can be converted to methyl chloride, which can then be reused in the direct process. The hydrolysate is washed for removal of residual acid, optionally neutralized with base addition or ion exchange technology, dried, and filtered. The typical yield consists of about 35–50 percent of cyclic oligomers, and the remainder consists of linear oligomers. Water can be added to the hydrolysate, the cyclic oligomers, or the linear oligomers for additional chloride removal.

The complete conversion of dimethyldichlorosilane to only linear oligomers is also possible in the continuous hydrolysis operation. In this operation, the cyclic oligomers are separated from the linear oligomers by a stripping process, and the cyclic oligomers are mixed with the dimethyldichlorosilane. This mixture undergoes equilibration to chloro-terminated oligomers, and is subsequently hydrolyzed. The silanol-stopped linear oligomers are then used in the manufacture of other silicone polymers.

The aqueous hydrogen chloride produced in the hydrolysis process presented a problem of acid disposal or recovery. Both the expense of disposing of the environmentally hazardous aqueous hydrogen chloride solution, and the inherent value of chloride made recovery the preferred option. One procedure for recovering anhydrous hydrogen chloride from the aqueous hydrogen chloride has been to distill the solution to produce a constant boiling hydrogen chloride-water azeotrope along with anhydrous hydrogen chloride. A significant amount of energy however, is required in that process.

Therefore, there is a need in the art for a process that provides for increased recovery of hydrogen chloride. This can be achieved according to this invention by running the process under certain prescribed conditions, feed rates, and inputs into the loop containing the equipment for carrying out the processing functions. The process herein provides an improvement in chloride recovery, and an economic benefit in enabling recovery of a valuable commodity once considered an environmental hazard.

SUMMARY OF THE INVENTION

Thus, the invention is directed to a method of hydrolyzing chlorosilanes to produce a hydrolysate. It is carried out in a looped system containing a hydrolysis reactor, an HCl purifier, a wash means, and a separator. The method involves the steps of:

(i) feeding chlorosilanes from an external source to the hydrolysis reactor,
(ii) feeding water from an external source to the wash means,
(iii) feeding a high concentration aqueous HCl of at least 10 percent by weight HCl from an external source to the hydrolysis reactor between the wash means and the hydrolysis reactor,
(iv) removing anhydrous hydrogen chloride from the HCl purifier,
(v) removing hydrolysate from the wash means, and
(vi) removing a low concentration aqueous hydrogen chloride of 0.1 to less than 10 percent by weight HCl from the looped system.

Preferably, the high concentration aqueous HCl in (iii) is at least greater than 20 percent by weight HCl and less than 42 percent by weight HCl. More preferably, the high concentration aqueous HCl in (iii) is 32–36 percent by weight HCl. The low concentration aqueous HCl in (vi) is preferably 0.1 to less than 5 percent by weight HCl, more preferably 0.1 to less than 1 percent by weight HCl.

Some particularly novel characteristics of the process include the fact that pure water is fed to the process only via the wash means, rather than directly into the hydrolysis reactor itself. A second feature is that a low concentration aqueous HCl solution can be withdrawn from the wash means and discarded in an amount sufficient to maintain a stoichiometric amount of water in the hydrolysis reactor. A third feature of the invention is that a high concentration aqueous HCl solution can be introduced into the loop in an amount sufficient to enhance the recovery of HCl vapor from the process.

These and other features of the invention will become apparent from a consideration of the detailed description.

BRIEF DESCRIPTION OF THE DRAWING

The single view of the drawing is a functional representation of the equipment and the general flow pattern of materials used in carrying out the process of the present invention.

DETAILED DESCRIPTION OF THE INVENTION

As can be seen in the drawing, the hydrolysis process according to the invention is carried out in a loop containing a hydrolysis reactor, an HCl purifier, a separator, and a wash means capable of washing in multiple steps. The chlorosilane is fed to the hydrolysis reactor where the hydrolysis reaction takes place. Exiting the hydrolysis reactor is a mixture containing a liquid hydrolysate, aqueous HCl, and HCl vapor. The HCl vapor is separated from the liquid hydrolysate and the aqueous HCl in an HCl purifier located downstream of the hydrolysis reactor. The liquid hydrolysate and the aqueous HCl exiting the HCl purifier are passed into a separator where the liquid hydrolysate is separated from the aqueous HCl. The aqueous HCl is a saturated high concentration aqueous HCl. It is returned to the hydrolysis reactor along with low concentration aqueous HCl from the wash means.

The liquid hydrolysate is passed into the wash means for treatment with pure water fed to the wash means. The only supply of pure water to the hydrolysis loop is the supply of pure water being fed to the wash means. No separate supply of pure water is fed to the hydrolysis reactor itself. Purified liquid hydrolysate is withdrawn from the wash means, and a low concentration aqueous HCl is withdrawn from the wash means and combined with the aqueous HCl exiting the separator. Simultaneously, a portion of the low concentration aqueous HCl from the wash means is removed and discarded. Typically, the low concentration aqueous HCl contains less than about five percent by weight of hydrogen chloride, preferably less than about one percent by weight of hydrogen chloride. The amount of discarded low concentration aqueous HCl is used as a means for controlling the total amount of water available in the hydrolysis reactor for conducting the hydrolysis reaction.

As can be seen, the process requires contact between two immiscible liquid phases of reactants. One phase comprises the chlorosilane and the other phase comprises the aqueous hydrogen chloride. The interfacial contact between these two phases must be facilitated by a dispersive means that will provide an adequate dispersion of one of the phases in the other.

The chlorosilane feed for the process contains chlorosilanes of the formula $R_2SiCl_2$. R can be hydrogen or a hydrocarbon radical such as an alkyl group, a cycloalkyl group, an aryl group, or an aralkyl group containing 1–20 carbon atoms. The hydrocarbon radical can be a group such as methyl, ethyl, propyl, isopropyl, n-butyl, isobutyl, tert-butyl, sec-butyl, pentyl, hexyl, phenyl, tolyl, benzyl, and beta-phenylethyl. Some examples of suitable chlorosilanes include compounds such as dimethyldichlorosilane $(CH_3)_2SiCl_2$, diethyldichlorosilane $(C_2H_5)_2SiCl_2$, di-n-propyldichlorosilane $(n-C_3H_7)_2SiCl_2$, di-i-propyldichlorosilane $(i-C_3H_7)_2SiCl_2$, di-n-butyldichlorosilane $(n-C_4H_9)_2SiCl_2$, di-i-butyldichlorosilane $(i-C_4H_9)_2SiCl_2$, di-t-butyldichlorosilane $(t-C_4H_9)_2SiCl_2$, n-butylmethyldichlorosilane $CH_3(n-C_4H_9)SiCl_2$, octadecylmethyldichlorosilane $CH_3(C_{18}H_{37})SiCl_2$, diphenyldichlorosilane $(C_6H_5)_2SiCl_2$, phenylmethyldichlorosilane $CH_3(C_6H_5)SiCl_2$, dicyclohexyldichlorosilane $(C_6H_{11})_2SiCl_2$, and methyldichlorosilane $CH_3SiHCl_2$. The preferred chlorosilanes are dimethyldichlorosilane and methyldichlorosilane $CH_3SiHCl_2$. If desired, trichlorosilanes $R_3SiCl$ can also be used, where R is the same as defined above. A preferred trichlorosilane, for example, is trimethylchlorosilane $(CH_3)_3SiCl$.

The process of the instant invention is run with a stoichiometric amount of water in the hydrolysis reactor loop in relation to chloride present on the chlorosilane fed to the loop. For purposes of this process, stoichiometric equivalence is one mole of water per two moles of chloride added to the process as chlorosilane.

The water exiting the hydrolysis reactor is essentially saturated with hydrogen chloride. By essentially saturated is meant that under process conditions, the water leaving the reactor contains a concentration of hydrogen chloride, such that additional chloride released as a result of the hydrolysis reaction, is evolved from the process as anhydrous hydrogen chloride.

The process can be run at a temperature of about 10° C. to 100° C. A preferred temperature is within a range of about 25° C. to 40° C. The pressure within the hydrolysis reactor in which the process is run can be within a range of less than one atmosphere to ten atmospheres. The pressure of the vapor exiting the hydrolysis reactor in which the process is run can be within the range of less than one atmosphere (absolute) to ten atmospheres. A preferred pressure is up to 1.5 atmospheres when the exiting hydrogen chloride gas can be compressed for downstream usage, and a most preferred pressure is between 4.5 and 5.5 atmospheres when gas compression can be avoided.

Isolation of the components of the hydrolysate exiting the hydrolysis reactor can be achieved by any suitable means for separating gas and liquid phases, and for separating multiphase liquids. According to the invention, the hydrogen chloride vapor is removed from a port in an HCl purifier, and the liquid hydrolysate phase is removed from a port in the HCl purifier located beneath the liquid level in the HCl purifier. The removed liquid phase exiting the HCl purifier consists of an aqueous HCl phase and a liquid hydrolysate phase containing the siloxanes. The aqueous HCl phase is separated from the liquid hydrolysate phase in a separator. This separation can be made by techniques such as stripping, centrifugation, coalescence, membrane separation, or gravity separation enhanced by mechanical baffles to shorten the mean flow path of the phases to be separated.

The separated aqueous HCl is recycled from the separator to the hydrolysis reactor. The aqueous phase entering the hydrolysis reactor can be preheated prior to introduction into the hydrolysis reactor to maintain the temperature of the hydrolysis reactor at the desired temperature. Preheating can be achieved by standard means, for example, by providing heat to the conduit through which the aqueous HCl is returned to the process, or by using heat exchange known in the art.

To assure product stability, one or more water washes of the liquid hydrolysate are performed in a wash means to remove residual chloride. The preferred method for the wash process is to perform the wash with a stoichiometric excess of water, in relation to the initial feed of chloride as diorganodichlorosilane to the process. The water used to wash the siloxanes in the liquid hydrolysate is recycled to the hydrolysis reactor as a low concentration aqueous HCl. It is combined with the aqueous HCl exiting the separator. A portion of the low concentration aqueous HCl from the wash means is removed and discarded as noted above.

The following example is set forth in order to illustrate the invention in more detail.

EXAMPLE

Dimethyldichlorosilane was continuously hydrolyzed in a stoichiometric amount of water in the form of concentrated aqueous HCl at 25° C. to 40° C. The products of this reaction were separated into a vapor phase for further purification to HCl and two liquid phases. The liquid phase of saturated aqueous HCl was collected by gravity settling and recycled to the hydrolysis reactor. The liquid hydrolysate phase was decanted for further water washing and separation. In the example, a stoichiometric excess of pure water was fed to the wash means in the ratio of 1.89 W.

W represents the stoichiometric amount of water required in the hydrolysis reactor for the initial dimethyldichlorosilane reaction to occur in the hydrolysis reactor. An amount of water equal to 1.25 W was discarded from the wash means in the form of dilute aqueous hydrochloric acid containing less than about one percent by weight of hydrogen chloride. A separate amount of water 0.36 W was fed into the system for the hydrolysis reaction of the dimethyldichlorosilane in the form of aqueous HCl containing 32 percent by weight of HCl. This increased the overall anhydrous HCl recovery to 104 percent of the theoretical amount of HCl available from dimethyldichlorosilane.

Other variations may be made in compounds, compositions, and methods described herein without departing from the essential features of the invention. The embodiments of the invention specifically illustrated herein are exemplary The invention of claimed is:

1. A method of hydrolyzing chlorosilanes to produce a hydrolysate in a looped system containing a hydrolysis reactor, an HCl purifier, a wash means, and a separator. the method comprising:
   (i) feeding chlorosilanes from an external source to a hydrolysis reactor where a hydrolysis reaction occurs and produces a mixture containing a liquid hydrolysate, aqueous HCl, and HCl vapor;
   (ii) passing liquid hydrolysate, aqueous HCl, and HCl vapor produced in (i) through an HCl purifier where anhydrous hydrogen chloride is removed from the mixture and the looped system;
   (iii) passing liquid hydrolysate and aqueous HCl from the HCl purifier into a separator where liquid hydrolysate is separated from aqueous HCl;
   (iv) returning aqueous HCl from (iii) to the hydrolysis reactor;
   (v) feeding liquid hydrolyzate from (iii) into a wash means;
   (vi) feeding water from an external source into the wash means to purify the liquid hydrolyzate;
   (vii) removing purified liquid hydrolysate from the wash means and the looped system;
   (viii) returning low concentration aqueous HCl from the wash means to the hydrolysis reactor;
   (ix) removing low concentration aqueous HCl from the wash means and the looped system, wherein the low concentration aqueous HCl is at a concentration of 0.1 to less than 10 percent by weight; and
   (x) feeding high concentration aqueous HCl of at least 10 percent by weight HCl from an external source to the hydrolysis reactor.

2. A method according to claim 1 in which the high concentration aqueous HCl in (iii) is at least greater than 20 percent by weight HCl and less than 42 percent by weight HCl.

3. A method according to claim 2 in which the high concentration aqueous HCl in (iii) is 32–36 percent by weight HCl.

4. A method according to claim 1 in which the low concentration aqueous HCl in (vi) is 0.1 to less than 5 percent by weight HCl.

5. A method according to claim 4 in which the low concentration aqueous HCl in (vi) is 0.1 to less than 1 percent by weight HCl.

6. A method according to claim 1 in which the chlorosilanes are selected from the group consisting of dimethyldichlorosilane, diethyldchlorosilane, di-n-propyldichlorosilane, di-i-propyldichlorosilane, di-n-butyldichlorosilane, di-i-butyldichlorosilane, di-t-butyldichlorosilane, n-butylmethyldichlorosilane, octadecylmethyldichlorosilane, diphenyldichlorosilane, phenylmethyldichlorosilane, dicyclohexyldichlorosilane, methyldichlorosilane, and trimethylchlorosilane.

* * * * *